June 5, 1928.
W. E. WILLIAMS
1,672,239
DISK WHEEL USING DEMOUNTABLE RIM
Filed Aug. 1, 1922
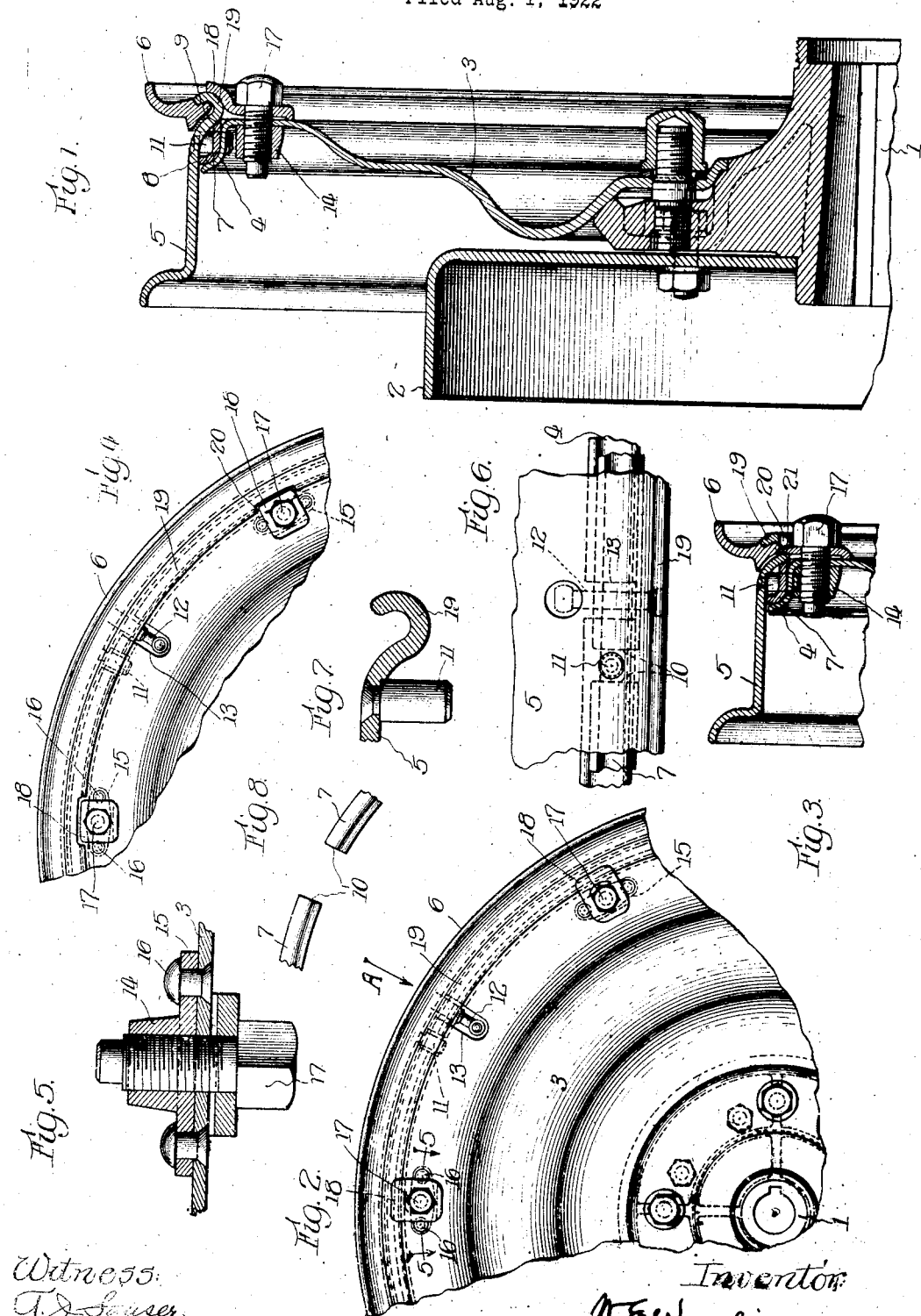

Patented June 5, 1928.

1,672,239

UNITED STATES PATENT OFFICE.

WILLIAM ERASTUS WILLIAMS, OF WILMETTE, ILLINOIS, ASSIGNOR, BY MESNE ASSIGNMENTS, TO STEEL WHEEL CORPORATION, OF LANSING, MICHIGAN, A CORPORATION OF MICHIGAN.

DISK WHEEL USING DEMOUNTABLE RIM.

Application filed August 1, 1922. Serial No. 579,017.

My invention relates to a device that fastens a rim to the margin of a disk, but the same device may be used on other types of wheels, besides disk wheels, and the object of the invention is to accommodate a standard rim to fit the margin of a disk or the felloe portion of a wheel.

Reference will be had to the accompanying drawing, in which

Figure 1 is a radial section through half of a wheel.

Figure 2 shows an elevation of a portion of the same wheel shown in Figure 1.

Figure 3 shows a modified form of a clip fastening.

Figure 4 is an elevational view of a portion of the wheel of the form shown in Figure 3.

Figure 5 is an enlarged sectional detail on line 5—5 of Figure 2.

Figure 6 is an edge view of the wheel looking in the direction of the arrow A, indicating the valve stem arrangement.

Figure 7 is a section through the driving lug of the rim.

Figure 8 shows the gap between the ends of the clamping ring 7.

In the drawing, 1 indicates the hub of an ordinary automobile wheel, here shown as being a rear hub, associated with a brake drum 2. The reference numeral 3 indicates a disk which forms the web of a wheel, 4 a marginal flange that is turned on the disk which forms the seat that carries the load on the disk, 5 an ordinary quick detachable pneumatic tire rim having the side ring 6, and 7 a loose clamping ring having a radial seat 8, and an inclined seat 9 that bears on the inside of the rim 5, and this ring 7 is seated on the flange 4 of the disk 3. The ring 7 is a split ring and its ends are spaced apart as is indicated by 10 in Figure 8.

A driving lug 11 is secured to the rim 5 and fits into a perforation in flange 4 of the disk and passes down between the ends 10 of the clamping ring 7 and thus registers the rim and clamping ring in the same place on the disk every time.

With my device an angle valve stem is used for inflating the pneumatic tire, and this angle valve stem is shown by 12, and the disk is cut out or apertured as is indicated by 13, to allow the direct entry of this angle valve sidewise through the margin of the disk, in the application and removal of the rim to and from the disk.

A series of fixed nuts 14, are secured by their flanges 15 and rivets 16 to the disk 3, and a series of screws 17 screwing into the nuts 14, clamp a series of clips 18 which hold the rim 5 onto the margin of the disk.

The clips 18 are seated under the outer edge 19 of the rim and because of this the bolt circle of the bolt 17 must be a little smaller in diameter to accommodate the bolt head than is the case when I use the form shown in Figures 3 and 4. In Figures 3 and 4 I notch out small holes 20, at intervals, around the rim where the clamping clips occur, and thus the clip then may be a straight clip having a bearing end 21, which bears against the edge of the notch 20, and this arrangement permits a larger diameter bolt circle and gives a little better purchase of the screw 17 upon the clip 18.

The clamping ring 7 being a loose ring acts as an expanding device when the bolts 17 are screwed or tightened up and thus wedges outwardly between the disk and the rim, and makes a snug fit for the parts.

This clamping ring 7, is in effect an adapter ring which accommodates an ordinary wire wheel rim to be used on a disk wheel.

What I claim is:—

1. In a device of the class described, a demountable rim for carrying a pneumatic tire, a loose adapter ring mounted on the inside of the said demountable rim, with a disk wheel having a marginal flange turned on its edge for a seat for the said adapter ring with means for clamping the said parts together in fixed relationship.

2. In a device of the class described, a disk wheel having a marginal flange turned on the disk, a ring seated on this flange and a demountable rim seated on said ring, with a series of clamping clips and clamping bolts and adapted to press the demountable rim laterally onto the said ring and rim of the disks.

3. The combination with a wheel body having a lateral, peripheral flange, of a transversely divided expansible ring mounted on the flange and having on one side a portion projecting outwardly with respect to the wheel's axis, to afford a rim bearing, and on the other side a rim-receiving face inclined to the plane of the wheel, a demountable rim fitting over said outwardly projecting portion and itself having an inwardly extending portion fitting against said inclined face, and clamping devices secured to the wheel and arranged to press the rim against said inclined face.

4. In a device of the class described, a wheel tread adapted to carry a loose ring, a transversely divided ring adapted to be seated on the said tread of the wheel, with the ends spaced apart; with a demountable rim mounted on the said loose ring and tread of the wheel, and provided with a fixed pin adapted to pass between the ends of the said ring and seat in an aperture in the tread of the wheel to prevent rotary movement between the said parts.

5. The combination with a wheel body, a demountable rim therefor, of a transplit adapter ring having its ends spaced apart and interposed between the wheel body and rim, and clamping means to force the rim onto the adapter in constrictive relation, and the usual driving lug accommodated in the space between the ends of the adapter ring.

Signed at Chicago, in the county of Cook and State of Illinois, this 13th day of July, 1922.

WILLIAM ERASTUS WILLIAMS.